Oct. 24, 1939.     G. G. HARPER     2,177,106
RECORD CARD SYSTEM
Filed Dec. 29, 1937     3 Sheets-Sheet 1
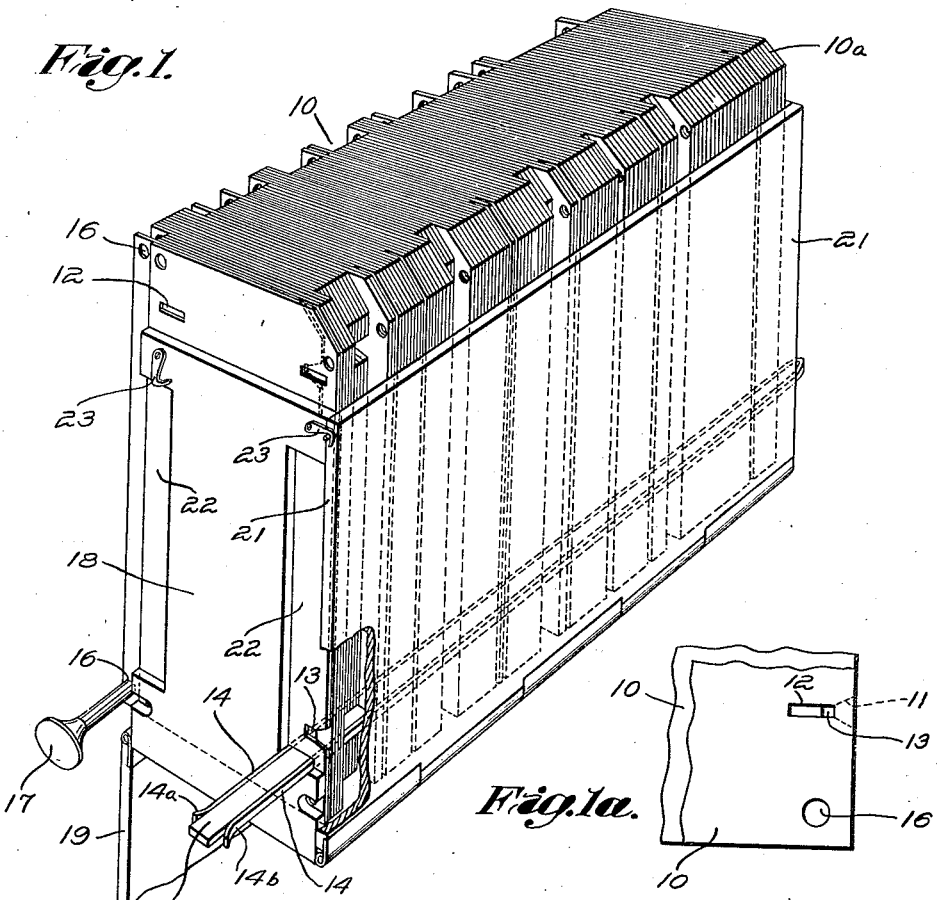
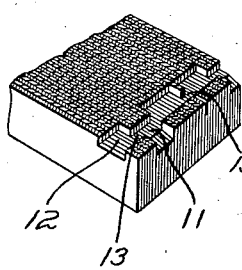
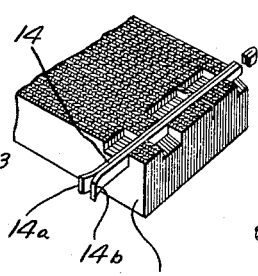
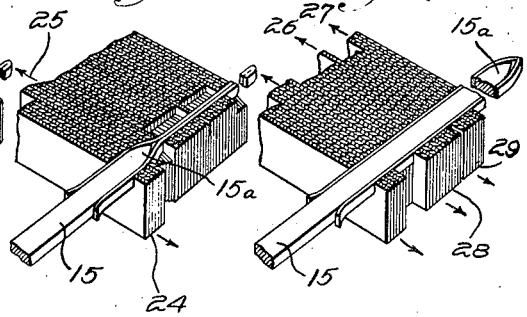
Inventor
George G. Harper
by John R. Hobson
Attorney Oct. 24, 1939.  G. G. HARPER  2,177,106
RECORD CARD SYSTEM
Filed Dec. 29, 1937  3 Sheets-Sheet 2

Inventor
George G. Harper
by John R. Hobson
Attorney

Oct. 24, 1939.　　　　G. G. HARPER　　　　2,177,106
RECORD CARD SYSTEM
Filed Dec. 29, 1937　　　　3 Sheets-Sheet 3
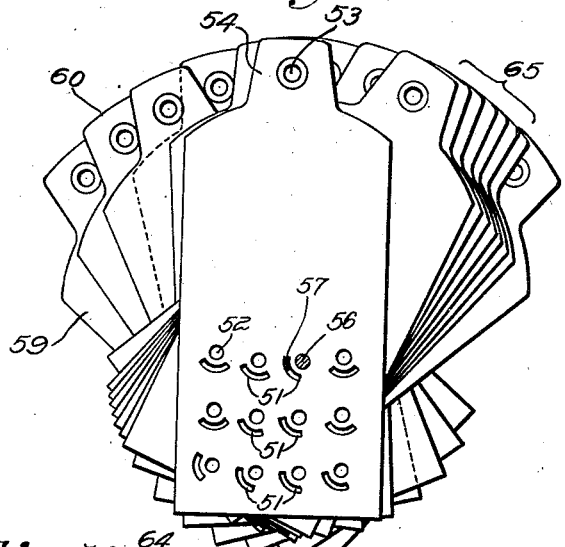
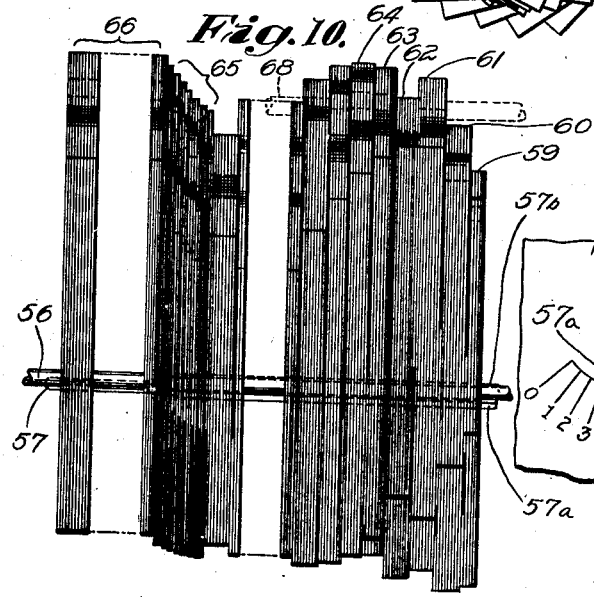
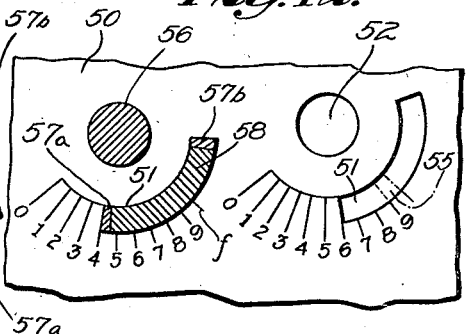
Inventor
George G. Harper
by John R. Hobson
Attorney Patented Oct. 24, 1939

2,177,106

UNITED STATES PATENT OFFICE 2,177,106

RECORD CARD SYSTEM

George G. Harper, West Hartford, Conn.

Application December 29, 1937, Serial No. 182,206

12 Claims. (Cl. 129—16.1)

This invention relates to record card systems wherein data is recorded on the cards by punching or cutting openings therein, which openings also are utilized for the purpose of sorting or classifying the cards.

Record card systems of this kind may be referred to either as the automatic system, in which the cards are sorted and data thereon tabulated automatically, or the manual system according to which the cards are sorted manually and the data thereon is manually tabulated. Although the automatic system has been more highly developed and more widely used than the manual system, it is basically inferior to it because only one card at a time can be sorted automatically, whereas in the manual system a substantial number of cards may be sorted simultaneously. Thus, at least theoretically, the manual system is many times faster in sorting than the automatic system, and therefore has an important advantage over it.

However, the manual system has not been used to the full extent of its possibilities because of certain disadvantages in or objections to the prior systems or methods of this type. One important disadvantage has been the limited number of cards that may be sorted in one operation.

One of the objects of the present invention is to provide a novel record card system by the employment of which a much greater number of cards may be sorted in one operation than in prior manual systems.

Another reason that prior manual systems have not been more widely used is that usually the relative displacement in, or separation of cards from, the stack of cards to be sorted depends upon the force of gravity which is apt to be counteracted by friction or magnetic attraction. This may result in incomplete and incorrect sorting.

It is a further object of this invention to provide a novel record card system wherein, instead of depending upon the uncertain action of gravity, the sorting is effected by positive action which permits both rapid and accurate sorting.

Another object is to provide a novel record card system wherein the sorting or displacement of cards may be accomplished with the minimum of injury to the cards. This permits the use of cheaper paper and makes the use of my novel system less expensive than prior manual systems.

A further object is to provide such a card system employing cards having slots or perforations of the smallest possible size and most compact arrangement which will permit the maximum amount of data to be punched in the cards without unduly weakening them. Preferably, the kind and arrangement of the perforations are such as to make possible easy and rapid key punching of the cards.

The above and other objects may be attained by punching perforations in the cards in accordance with a selected arrangement, evenly stacking a large number of cards and sorting the cards through aligned partially overlapping perforations positively and progressively from one end of the stack to the other. The invention contemplates the use of novel means to be inserted in aligned perforations to positively and progressively displace groups of cards relative to each other, whereby the respective groups may be classified. Such means may include novel means adapted to be passed through the aligned perforations to protect the cards from injury and to insure smooth and efficient operation.

The invention may be understood more fully from the following detailed description of the embodiments illustrated in the drawings, in which drawings:

Figure 1 is a perspective view of one embodiment of my novel record card system, partly broken away for clarity of illustration;

Fig. 1a is an enlarged fragmentary view in front elevation of a plurality of cards embodying the invention;

Figure 6:
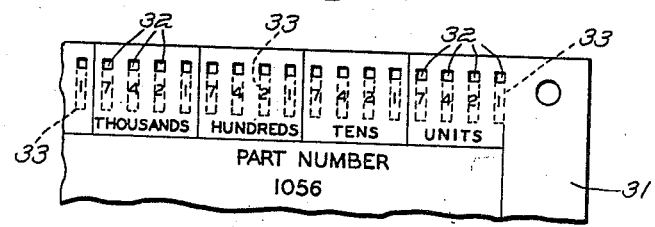
Figure 7:
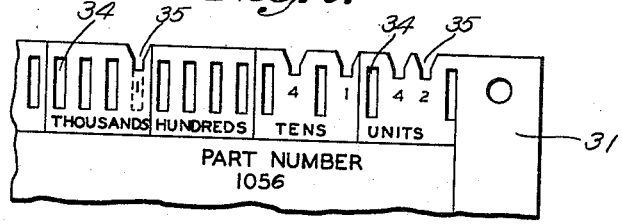
Figure 8:
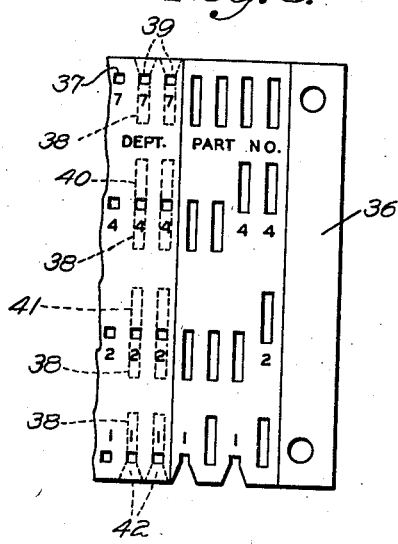
Figure 9:
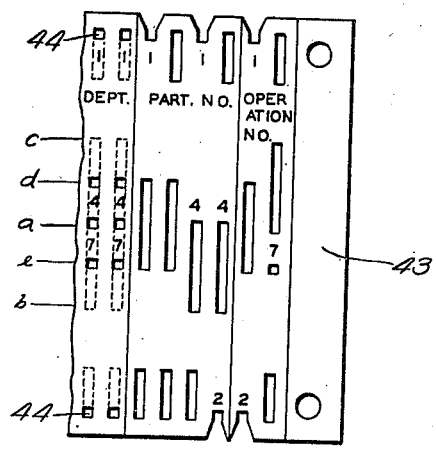

Figs. 2 to 5 inclusive are fractional sectional views in perspective of a stack of cards such as are shown in Fig. 1, illustrating several steps in sorting the cards into groups and showing the manner in which the cards may be perforated or cut;

Figs. 6 and 7 are plan views of portions of a novel form of card embodying the invention illustrating the manner in which the card may be punched;

Figs. 8 and 9 respectively are similar views of other forms of cards showing different methods of punching;

Fig. 10 is a view in side elevation of another embodiment of my novel system;

Fig. 11 is a view in rear elevation looking from the left of Fig. 10;

Fig. 12 is an enlarged fragmentary detail view of one of the cards in Figs. 10 and 11;

Fig. 13 is a side edge view of novel guide and card protective means shown in Figs. 10 and 11; and Fig. 14 is a top view of novel card displacing means, also shown in Figs. 10 and 11.

As illustrated in the drawings, my novel system may comprise record cards 10 preferably rectangular in shape, in which open slots 11 are punched in the edge portions for positive indications or closed slots 12 are punched in corresponding positions for null or zero indications. When the cards are evenly stacked or assembled for sorting, the corresponding closed and open slots at each position overlap and form an opening, indicated at 13, through the entire stack or assembly. The cards 10 may be beveled as at 10a to indicate when they are in the proper positions.

An important feature of this invention is that the slots 11 and 12 and the opening formed thereby are of such size and shape as to receive and coact with novel card displacing or sorting means which includes a guide or card protective means 14 and a wedge 15.

It will be observed by reference to Figs. 1a and 2 that if pressure is applied to opposite sides of the opening at 13, that is, to the inner ends of slots 11 and outer ends of slots 12, a relative horizontal displacement may be effected between the groups of cards having closed and open slots respectively and for a distance limited by the length of closed slots 12. Such displacement is effected by wedge 15, as later explained, and is sufficient to permit a rod 17 to be passed through openings 16 in one group of cards for removal thereof from the stack or assembly. The group thus removed may be placed at the back of the stack or placed elsewhere for classification.

A stack of cards to be sorted as above explained may be held in any desired manner, as by means of a box 18 having drop sides 19 and 21 and ends which are cut away, as shown at 22, to expose the marginal portions of the cards for sorting operations. It will be understood that such a box may conveniently be used to assemble evenly a large stack of cards, either or both sides of the box being hooked in closed position for this purpose by hooks 23. The corresponding slots 11 and 12 in the cards at each position will thus be held in the required overlapping relation and sorting may be accomplished at any position through the holes 13 extending through the stack at such positions. Cards in this condition are shown in Figs. 1a and 2.

As shown in Fig. 3, the next step is the insertion of guide 14 in the opening 13 at the desired sorting position. The guide preferably is passed through the entire stack until it projects at the rear. This guide 14 is preferably made of two strips 14a and 14b of polished metal, such as spring steel, joined, if desired, at the entering end or formed in one piece, as shown. The guide is of the proper cross-sectional dimensions to afford a sliding fit through the opening in the stack at the sorting position, and such dimensions are kept at the minimum in order to permit the use of small perforations.

The next step, as shown in Fig. 4, is to insert wedge 15 in the guide. Wedge 15 also preferably is made of polished metal such as steel, and there is very small frictional resistance to its movement in contact with the guide 14, parts 14a and 14b of which serve as slides for the wedge. Wedge 15 also is of small dimensions in cross-section, in order that the perforations may be small. The tip of the wedge is tapered at 15a, so as to spread the slides 14a—14b apart in its travel. The wedge acts as an inclined plane upon the slides to apply progressively through the stack lateral components of pressure against the opposite sides of the opening formed through the cards (at 13), that is, against the outer ends of slots 12 and the inner ends of slots 11. This results in a relative displacement of the respective groups of cards, the cards having closed slots 12 (negative punching) being moved to the right as shown by the arrow and the position of the group of cards at 24 in Fig. 4, and the open slotted cards (positive punching) being moved to the left as shown by the arrow and position of the group of cards at 25.

As shown by Fig. 5, continued travel of the wedge serves to displace additional cards, some to the left as at 26 and 27 and some to the right as at 28 and 29, until the entire stack has been operated upon, as shown by the projection of wedge 15 at the rear of the stack. In other words, the cards are progressively displaced into two groups by the positive action of the wedge.

Wedge 15, as shown, is of uniform width rearwardly of the tapered part 15a, but if desired may be given a slight taper toward its rear end for clearance.

It will be understood from the above description that it has been assumed that all the cards are free to move laterally of the path of the wedge 15, as would be the case in the use of box 18 with both sides open. However, the operation in Fig. 1 differs slightly from that shown in Figs. 2 to 5, in that the left side 19 of box 18 is open and the right side 21 of the box is closed for an operation at the lowermost right hand sorting position. Consequently, the negatively punched group of cards will be held by the closed side of the box against movement to the right, whereas the open-slotted or positively punched group will be projected at the left side of the stack as shown, and may then be impaled by the rod 17, removed from the stack and assembled for classification purposes. This is a desirable procedure because the open-slotted or positively punched cards usually constitute but a small percentage of the total number of cards which are sorted at one time and, therefore, the selection of them for removal reduces the effort required in sorting and permits more rapid work. When the operation is conducted at the left side of the box, the left side 19 thereof may be closed and side 21 opened.

I have stated above that after the cards have been impaled by rod 17 they may be removed from the stack and assembled for classification purposes. The removed cards may be assembled in any desired manner in a suitable box or otherwise but I prefer to push the cards remaining in the box toward the front thereof and to place the impaled cards in the space thus provided at the back of the stack. By repeating this operation until the sorting is finished, the cards may be arranged in the box in the desired sequences.

Cards having slots cut therein of such shape and of the minimum size to receive my novel guide and wedge may be arranged in various compact groups or classifications. Figs. 6, 7, 8 and 9 will now be referred to in describing examples of such cards.

Figs. 6 and 7 illustrate a card 31 similar to the cards 10 in Figs. 1 to 5, Fig. 6 showing the card in blank or incomplete form and Fig. 7 the same card cut or punched in a certain manner to make a record. Preferably, the card 31 initially is provided with holes as indicated at 32, 32, 32, etc., punched in each position of the various classifications which may be identified by printed matter on the card. By way of example, the portion of the card shown is intended to record the part number of an article of manufacture, which number may include up to four digits. Accordingly, the field is divided into units, tens, hundreds and thousands. In order to save space and to simplify the sorting operation, but four positions are provided in each division, numbered respectively 7, 4, 2, 1, employed singly or in combinations of two for the numbers 1 to 9 in each division. These numbers may be printed on the portions of the cards indicated in dot-and-dash lines at 33, which portions are punched out for a null or zero indication, as shown at 34 in Fig. 7, or are not punched out in case positive indications are provided by slots 35 cut through the edge portion of the card, in which case the numerals remain to provide a printed record corresponding to the punched record. Thus, Fig. 7 shows the card 31 in which the number 1056 has been punched (1 in the thousands division, 0 in the hundreds, 4 plus 1 or 5 in the tens and 4 plus 2 or 6 in the units), the printed numerals remaining in the unpunched zero positions below slots 35 to provide a readable record of the number punched. Prior to punching, the number 1056 may be recorded in long hand, as shown, in a space provided for this purpose. This system may be employed for recording other data along the edges of the card. It will be understood that cards of the type shown in Figs. 6 and 7 are sorted by the means and method described in reference to Figs. 1 to 5, the slots 34 and 35 being of the proper shapes and sizes to receive and coact with guide 14 and wedge 15.

In Fig. 8, I have shown a modified form of card 36 in which the holes of each division are arranged in groups which are punched crosswise of the card. In the first division at the left marked "Dept." I have indicated initial holes 37 for three digits, the top course for sevens, the second lower course for fours, the third lower for twos and the bottom course for ones. The null or zero indications will be punched at 38, as shown by the portions outlined by dash-and-dot lines and bearing the printed numerals for direct reading of positive punching of slots which may be formed at 39, 40, 41 and 42. Slots 39 and 42 are edge slots while slots 40 and 41 are closed internal slots. Sorting of cards at these internal positions may be effected in the same ways as cards 10 in Figs. 1 to 5, except that the guide 14 and wedge 15 must be withdrawn from the stack after they have been used for sorting to permit the final separation of sorted out cards by means of the rod 17. Also, if box 18 is employed, openings corresponding to these internal positions must be provided in its ends to give access of guide and wedge to the cards.

In the second division of card 36, provision is made for "Part No.", as in Figs. 6 and 7, the number 1056 being punched as shown by reading (from left to right) 1 in the first column, zero in the second, 4 and 1 or 5 in the third, 4 and 2 or 6 in the fourth column.

In Fig. 9, I have shown at 43 a modification of card 36 wherein the same statistics are recorded by combining the fours and sevens into one sorting position and by putting the ones in the top row and the twos in the bottom row. The manner of punching the ones and twos will be understood from the description of the holes for sevens and ones in Fig. 8.

However, the provisions for the fours and sevens require special explanation. Again in this figure, I have indicated the "Dept." division in incomplete form, but with initial openings shown at 44. Briefly, the fours are punched from $a$ to $b$, removing the printed sevens and leaving the printed fours; the sevens are punched from $a$ to $c$, removing the printed fours and leaving the printed sevens; and the zeros are punched from $d$ to $e$, removing the printed fours and sevens.

The locations of zero, four and seven openings are shown in the divisions for "Part No." and "Operation" provided in this card. The part number recorded is 1056 and the operation number is 37.

In sorting cards punched as illustrated in Fig. 9, the fours, sevens and zeros at one position will all be displaced into three groups by a single operation of the wedge: the cards punched for fours being displaced toward the top edges of the cards for a distance equal to that from $a$ to $d$, and the sevens toward the bottom edges of the cards for a distance equal to that from $a$ to $e$. Cards punched for zero will not be displaced in either direction, and will remain after the cards punched for fours and sevens are removed in two groups by being impaled, as explained in reference to Fig. 1.

Instead of displacing groups of cards positively and progressively by rectilinear movement, as required in the sorting of cards illustrated in Figs. 1 to 9, cards may be so punched and operated upon as to effect such displacement by rotary movement as illustrated in Figs. 10 to 12, modified forms of guide and wedge shown in Figs. 13 and 14 being employed for this purpose. Also, in the use of this rotary method, cards may be displaced and sorted for a complete series of digits in one operation.

This rotary method may be performed by the use of cards in which arcuate slots 51, all of the same length, are punched at various sorting positions. Each slot is centered about a round hole 52 and its angular position determines the digit or other item which it is intended to record. For example, the cards shown are punched at each position for the digits 0 to 9. Fig. 12 shows, at the left, a slot 51 in the position for recording the digit 4, and at the right a slot for the digit 6. Fig. 12 also shows how numbers may be printed on the face of each card for visual reading of the record. (This printing does not appear in Fig. 11 because this figure is a rear view.)

The cards may have a substantial number of slots punched thereon. In the cards shown, there are twelve slots and associated holes arranged in three rows of four each, see Fig. 11. Thus there are twelve sorting positions, at each of which the cards may be sorted into ten groups for the digits 0 to 9.

Preferably each row of openings is punched on the arc of a circle having its center in an opening 53 in the narrowed tab portion 54 of the card, the rows being at different radial distances from such center.

In punching cards at a given position, slots 51 will be located at various angular positions, each of a length equal to the distance from zero to $f$, and having one end at one of the radial lines zero, 1, 2, etc., as indicated in Fig. 12. Therefore, when the cards are evenly stacked, the slots at each position will overlap at least for a distance equal to the space from 9 to $f$ which provides an opening through the entire stack for sorting purposes. This opening is indicated at 55, Fig. 12, and corresponds to the opening at 13, Figs. 1 and 1a.

Sorting of cards according to this form of the invention is accomplished by first evenly stacking the cards. A rod 56, Figs. 10 to 12, is then passed through the aligned holes 52 at the selected sorting position. A guide 57 now is passed through the opening 55 formed by the overlapping arcuate slots, see Fig. 10.

The guide 57 is similar to guide 14 of Figs. 1 and 2 to 5, consisting of members 57a and 57b, which are of segmental shape in cross-section to fit the opening of corresponding shape at 55.

After the guide has been passed through the entire stack of cards, a wedge 58 is inserted between the members of the guide and passed through the stack from right to left looking at Fig. 10.

Wedge 58 is similar to wedge 15, having the tapered end portion 58a, but is arcuate shaped in cross-section, as shown in Fig. 12, to afford a sliding fit in the arcuate slots 51 of the cards 50.

Movement of wedge 58 between the members of guide 57 serves to rotate the cards 50 about rod 56 as the tapered end 58a of the wedge serves to spread the members 57a—57b of the guide, thus turning the cards into various angular positions, depending upon the angular positions of slots 51 in the various cards.

As illustrated in Figs. 10 and 11, the stack of cards is fanned into groups with the holes 53 of each group in registry. Groups of cards at 59, 60, 61, 62, 63, 64 and other groups through which the tapered end of wedge 58 has passed, are so shown while groups of cards indicated by the bracket at 65 (Figs. 10 and 11) are in positions indicating the progressive action thereon by wedge 58 and the groups indicated by the bracket at 66 are in their initial vertical positions, not yet having been acted upon by the wedge.

Upon completion of the travel of the wedge, all the cards will be moved into their respective angular positions, with the result that the holes 53 in each group will be in registry. The groups may then be impaled by rods, such as indicated at 68, and upon removal of wedge 58 and guide 57, the groups may be separated from each other by the rods for classification. In the system shown in the drawings, there will be ten groups and ten rods impaling them. The rods may be conveniently mounted for simultaneous passage through holes 53.

The location of holes 52 on the arc of a circle centering in hole 53 results in the positioning of cards 50 with holes 53 on the arc of a circle centering in any one of the holes 52 in any one transverse row. Thus the rods 68 may be similarly mounted to pass simultaneously through the holes 53 at the various angular positions into which the cards are displaced in groups.

From the foregoing, it will be seen that I have provided practical and efficient means for attaining the objects of the invention. A large number of cards, say 3,000 or 4,000, may be sorted into two or more groups at one time by simply stacking the cards, inserting the protective guide (14 or 57), then inserting the wedge, and finally impaling the cards and separating them for classification (after withdrawal of guide and wedge where necessary).

Such an unusually large number of cards may be acted upon because the progressive action of the wedge gradually overcomes the accumulated friction of the entire stack, while injury to the cards is prevented because such progressive action greatly reduces the pressure which must be applied to individual cards to displace them. Also, the guide protects the openings in the cards from friction and wear. Therefore, possible injury to the cards is reduced to the minimum, even when the cards are made of paper which is relatively light in gauge and not of the best quality. This permits savings to be effected in the cost of the cards.

Furthermore, the positive action of the wedge makes the sorting operation absolutely certain; in transfixing a stack of cards by the wedge, every card must necessarily be displaced exactly the correct distance in the proper direction to permit it to be impaled and removed for classification, with the result that correct sorting is assured.

Cards used in my novel system may have openings or perforations punched therein which, while designed to receive guide and wedge, still may be made small because the cross-sectional area of wedge and guide may be small. The perforations may be compactly arranged and punched in the cards in large number without unduly weakening the card. Consequently, a relatively large amount of information may be recorded on a single card without necessarily using a large card.

The arrangement of perforations may be such as to permit rapid and easy key punching, as when the slots all extend in one direction along the cards (see, for example, Figs. 6 to 9), which makes it unnecessary to turn the cards in punching, as in certain prior systems employing cards punched on all four sides. In other words, the cards may be punched without being shifted after being placed in the bed of the punch.

My novel system not only permits the sorting of an unusually large number of cards at a time, but further increase in speed of sorting is afforded by the use of cards which can be sorted into three groups, as with cards such as illustrated in Fig. 9, or into ten groups (or more) in one operation when employing cards such as are shown in Figs. 10 to 12.

Various changes may be made in the details of construction of my novel system, or in the manner in which it is used without departing from the scope of the appended claims.

The word "hole" or "holes" as used in some of the claims is not limited to an opening or openings formed inwardly of the edge or edges of the cards, but also applies to an opening or openings formed or punched through the edge or edges of the cards.

Having thus disclosed my invention, I claim:

1. In a record card system, an even stack of record cards, said cards respectively having holes therein certain of which partially overlap and provide an opening through the even stack of said cards, and means for displacing some of said cards relative to other cards in said stack comprising means for applying pressure to opposite sides of said opening progressively from one end to the other of said stack, the holes in said cards corresponding in size and shape to the cross-sectional shape and size of at least a portion of said pressure applying means.

2. In a record card system, an even stack of record cards, said cards respectively having holes therein certain of which partially overlap and form an opening through the even stack of said cards, and means for displacing some of said cards relative to other cards in said stack comprising means for applying pressure to opposite sides of the opening thus formed progressively from one end to the other of said stack, and means slidable through said opening for protecting the holes in said cards from said pressure applying means.

3. In a record card system, an even stack of record cards, said cards respectively having holes punched therein including closed slots in some of the cards and open slots in the edge portions of the remaining cards so located in their respective cards as to partially overlap when all the cards are evenly stacked and form an opening through the stack of a certain size and shape in cross-section, slide members adapted to fit said opening when inserted therein, and a wedge adapted to be inserted between said slide members and to be passed through said opening, the entering end portion of said wedge being so shaped as to exert components of pressure through said slide members against the adjacent ends respectively of the closed and open slots to progressively effect relative displacement between the close-slotted and open-slotted cards during the passage of said wedge through said opening.

4. In a record card system, an even stack of record cards, said cards respectively having holes therein certain of which are so located as to partially overlap and form an opening through the evenly stacked assembly of said cards, slide members adapted to be projected through said opening, and a wedge adapted to slide through said opening between said slide members to displace certain of said cards relative to the remaining cards in the assembly.

5. In a record card system, an even stack of record cards, said cards respectively having holes therein certain of which are so located as to partially overlap and form an opening through the evenly stacked assembly of said cards, and means for selecting some of said cards of said stack comprising a member adapted to be passed through said opening and to apply pressure at opposite sides of said opening and thus effect relative displacement between cards composing said assembly.

6. In a record card system, an even stack of record cards, said cards respectively having holes punched therein in such positions that when the cards are evenly stacked certain of said holes partially overlap and form an opening through the stack, and means for selecting some of said cards of said stack including means adapted to be passed through said opening and to apply pressure to opposite sides of said opening to effect relative displacement of said cards positively and progressively from one end to the other of the stack, and said holes being so arranged that said cards are displaced into at least three groups when acted upon by said means.

7. In a record card system, an even stack of record cards, said cards respectively having holes punched therein in such positions that when the cards are evenly stacked certain of said holes partially overlap and form an opening through the stack, and means for selecting some of said cards in said stack including means adapted to be passed through said opening and to apply pressure to opposite sides of said opening to progressively displace said cards into groups, and said holes and last-named means being so shaped and arranged as to cause rectilinear movements of said cards in effecting such displacement.

8. In a record card system, an even stack of record cards, said cards respectively having holes punched therein in such positions that when the cards are evenly stacked certain of said holes partially overlap and form an opening through the stack, and means for selecting some of said cards in said stack including means adapted to be passed through said opening and to apply pressure successively to cards forming said opening from one end of the stack toward the other to progressively displace said cards into groups, said holes and said last-named means being so shaped and arranged as to effect rotary displacement of said cards, and means for supporting said cards for such rotary displacement.

9. In a record card system, an even stack of record cards, said cards respectively having holes punched therein in such location that when the cards are evenly stacked holes in some of the cards overlap holes in the remaining cards and an opening is formed through the stack, and means for selecting some of said cards in said stack including means adapted to be passed through said opening and to apply positive pressure at opposite sides thereof as said pressure applying means is passed through said opening to effect progressive displacement of some of the cards relative to others of said cards.

10. In a record card system, an even stack of record cards, said cards respectively having holes therein certain of which partially overlap and provide an opening through the even stack of said cards, and means for selecting some of said cards in said stack comprising an expansible device including separable members adapted to be passed through said opening and means for applying pressure between the members of said device and within said opening to in turn exert pressure on opposite sides of the opening through said stack and thus displace some of said cards in said stack relative to others thereof.

11. In a record card system, an even stack of record cards, said cards respectively having holes therein certain of which are so located as to partially overlap and form an opening through the evenly stacked assembly of said cards, and means for selecting some of said cards in said stack comprising a member having a tapered end portion for applying pressure in said opening to effect relative displacement between cards composing said assembly as said member is passed through said opening.

12. In a record card system, an even stack of record cards, said cards respectively having holes therein certain of which partially overlap and provide an opening through the even stack of said cards, means for supporting said stack so that some of the cards may be displaced relative to the other cards toward one side of said stack, and a device adapted to be inserted in said opening and so constructed as to apply pressure across said opening progressively from one end to the other of said stack to effect such relative displacement of said cards.

GEORGE G. HARPER.